United States Patent
Li et al.

(10) Patent No.: US 11,783,219 B2
(45) Date of Patent: Oct. 10, 2023

(54) QUANTUM DATA ERASURE METHOD, SYSTEM AND DEVICE, AND READABLE STORAGE MEDIUM

(71) Applicant: INSPUR SUZHOU INTELLIGENT TECHNOLOGY CO., LTD., Jiangsu (CN)

(72) Inventors: Chen Li, Jiangsu (CN); Xin Zhang, Jiangsu (CN); Jinzhe Jiang, Jiangsu (CN); Yaqian Zhao, Jiangsu (CN); Rengang Li, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/013,598

(22) PCT Filed: Jan. 23, 2021

(86) PCT No.: PCT/CN2021/073443
§ 371 (c)(1),
(2) Date: Dec. 29, 2022

(87) PCT Pub. No.: WO2022/052405
PCT Pub. Date: Mar. 17, 2022

(65) Prior Publication Data
US 2023/0196165 A1    Jun. 22, 2023

(30) Foreign Application Priority Data
Sep. 11, 2020  (CN) .......................... 202010954791.7

(51) Int. Cl.
*G06N 10/60* (2022.01)
*G06N 10/40* (2022.01)
*G06F 3/06* (2006.01)

(52) U.S. Cl.
CPC ........... *G06N 10/40* (2022.01); *G06F 3/0604* (2013.01); *G06N 10/60* (2022.01)

(58) Field of Classification Search
CPC .............................. G06N 10/40; G06N 10/60
See application file for complete search history.

(56) References Cited

U.S. PATENT DOCUMENTS

| | | | |
|---|---|---|---|
| 6,473,719 | B1 | 10/2002 | Steenblik |
| 2015/0200778 | A1 | 7/2015 | Shi et al. |

(Continued)

FOREIGN PATENT DOCUMENTS

| | | |
|---|---|---|
| CN | 106708470 A | 5/2017 |
| CN | 107562384 A | 1/2018 |

(Continued)

OTHER PUBLICATIONS

Hung et al. "Optimal Synthesis of Multiple Output Boolean Functions Using a Set of Quantum Gates by Symbolic Reachability Analysis", IEEE Transactions CAD ICS, 2006, pp. 1653-16.*

(Continued)

*Primary Examiner* — Li Wu Chang
(74) *Attorney, Agent, or Firm* — COOPER LEGAL GROUP, LLC

(57) ABSTRACT

A quantum data erasure method, system and device, and a readable storage medium. The method includes: acquiring an equal-probability quantum state system; measuring the equal-probability quantum state system to collapse the equal-probability quantum state system into a binary random number sequence; generating a corresponding random angle value according to the binary random number sequence; and performing a bitwise rotation operation on quantum data in a quantum device according to the random angle value to complete this quantum data erasure. In the present application, the introduction of a quantum true random number can (Continued)

ensure that erased data will not be recovered and reversely cracked, and is of great value in protecting data assets; moreover, randomly processed data still has the characteristics such as quantum coherence and quantum entanglement, and can be used in subsequent operations, whereby a time-consuming labor-intensive process of preparing a quantum system is not required every time.

18 Claims, 2 Drawing Sheets

(56) References Cited

U.S. PATENT DOCUMENTS

2020/0242208 A1* 7/2020 Daraeizadeh ............ G06F 30/30
2020/0250566 A1   8/2020 Majumdar

FOREIGN PATENT DOCUMENTS

CN   108776582 A   11/2018
CN   110471644 A   11/2019

OTHER PUBLICATIONS

Roffe, "Quantum Error Correction: An Introductory Guide", pp. 29, https://arxiv.org/pdf/1907.11157.pdf.*
Corresponding International Patent Application No. PCT/CN2021/073443, International Search Report, dated Jun. 9, 2021.
Corresponding International Patent Application No. PCT/CN2021/073443, Written Opinion, dated Jun. 9, 2021.
Corresponding Chinese Patent Application No. 202010954791.7, Notification of Grant, dated Apr. 13, 2022.
Yan, Xudong et al.,"Information Erasure and Heat Dissipation in Quantum Memory", Journal of Hubei University of Technology, vol. 21, No. 1, Feb. 28, 2006, ISSN:1003-4684 pp. 45-46 with English abstract.

* cited by examiner

QUANTUM DATA ERASURE METHOD, SYSTEM AND DEVICE, AND READABLE STORAGE MEDIUM

This application claims priority to Chinese Patent Application No. 202010954791.7, filed on Sep. 11, 2020 in China National Intellectual Property Administration and entitled "Quantum Data Erasure Method, System and Device, and Readable Storage Medium", which is hereby incorporated by reference in its entirety.

FIELD

The present application relates to the field of quantum data, in particular to a quantum data erasure method, system and device, and a readable storage medium.

BACKGROUND

A quantum computer is a kind of physical apparatus that performs mathematical and logical operations, and stores and processes quantum information according to the law of quantum mechanics. In the quantum computer, a basic information unit is qubit and an operand is a qubit sequence. Unlike the bits of a classical computer, the qubit sequence is not a specific value composed of 0 or 1, but is in a superimposed state therebetween. These special quantum states not only provide the possibility of quantum parallel computing, but also bring some properties to quantum computing, which cannot be expected by classical computing.

A quantum system is a limited resource and difficult to prepare. Therefore, it is inevitable to erase registers, storage devices, etc. of the quantum system in the process of computing, so as to acquire new computing and storage resources. A quantum-related storage device, on the other hand, serves as an information carrier with data to be protected. It is crucial to store important data securely and to destroy the data completely when not needed.

At present, by performing a unitary operation on a known quantum state, this quantum state may be prepared onto a standard state, and thus data deletion of the known quantum state can be achieved. However, if the quantum state to be erased is unknown, quantum data cannot be erased in this way.

Therefore, how to erase unknown quantum data is a technical problem to be solved by those skilled in the art currently.

SUMMARY

An object of the present application is to provide a quantum data erasure method, system and device, and a readable storage medium, which are configured for erasing unknown quantum data.

In order to solve the above-mentioned technical problem, the present application provides a quantum data erasure method, including:
acquiring an equal-probability quantum state system;
measuring the equal-probability quantum state system to collapse the equal-probability quantum state system into a binary random number sequence;
generating a corresponding random angle value according to the binary random number sequence; and
performing a bitwise rotation operation on quantum data in a quantum device according to the random angle value to complete this quantum data erasure.

Optionally, the acquiring an equal-probability quantum state system includes:
generating the equal-probability quantum state system according to formula $$H^n|0\rangle = \frac{1}{2^{n/2}} \sum_{x \in \{0,1\}^n} |x\rangle,$$

where $H^n$ is a Hadamard matrix, $|0\rangle$ is a standard quantum state, $|x\rangle$ is an equal-probability quantum state, and n is the number of equal-probability quantum states in the equal-probability quantum state system.

Optionally, the generating a corresponding random angle value according to the binary random number sequence includes:
converting the binary random number sequence into a decimal random number sequence; and
generating the random angle value according to a preset accuracy and the decimal random number sequence.

Optionally, the generating a corresponding random angle value according to the binary random number sequence includes:
generating a corresponding floating point number according to the binary random number sequence on the basis of a preset rule; and
determining the floating point number as the random angle value.

Optionally, after the generating a corresponding random angle value according to the binary random number sequence, the method further includes:
determining position information of non-sensitive data in the quantum data according to an input data desensitization instruction; and
setting the random angle value corresponding to the position information to zero, and performing a bitwise rotation operation on the quantum data according to the random angle value to complete this quantum data desensitization.

The present application also provides a quantum data erasure system, including:
an acquisition module, configured to acquire an equal-probability quantum state system;
a measurement module, configured to measure the equal-probability quantum state system to collapse the equal-probability quantum state system into a binary random number sequence;
a generation module, configured to generate a corresponding random angle value according to the binary random number sequence; and
a quantum data erasure module, configured to perform a bitwise rotation operation on quantum data in a quantum device according to the random angle value to complete this quantum data erasure.

Optionally, the generation module includes:
an acquisition submodule, configured to convert the binary random number sequence into a decimal random number sequence; and
a first generation submodule, configured to generate the random angle value according to a preset accuracy and the decimal random number sequence.

Optionally, the quantum data erasure system further includes:
a determination module, configured to determine position information of non-sensitive data in the quantum data according to an input data desensitization instruction; and a data desensitization module, configured to set the random angle value corresponding to the position information to zero, and perform a bitwise rotation operation on the quantum data according to the random angle value to complete this quantum data desensitization.

The present application also provides a quantum data erasure device, including:

a memory, configured to store a computer program; and a processor, configured to implement, when executing the computer program, the steps of the quantum data erasure method as described in any one of the above.

The present application also provides a readable storage medium having a computer program stored thereon which, when executed by a processor, implements the steps of the quantum data erasure method as described in any one of the above.

The quantum data erasure method provided by the present application includes: acquiring an equal-probability quantum state system; measuring the equal-probability quantum state system to collapse the equal-probability quantum state system into a binary random number sequence; generating a corresponding random angle value according to the binary random number sequence; and performing a bitwise rotation operation on quantum data in a quantum device according to the random angle value to complete this quantum data erasure.

In the technical solution provided by the present application, by measuring an acquired equal-probability quantum state system, the equal-probability quantum state system is collapsed into a binary random number sequence, a corresponding random angle value is then generated according to the binary random number sequence, and a bitwise rotation operation is performed on quantum data in a quantum device according to the random angle value to complete this quantum data erasure. The introduction of a quantum true random number in the whole process can ensure that erased data will not be recovered and reversely cracked, and is of great value in protecting data assets. Moreover, randomly processed data still has the characteristics such as quantum coherence and quantum entanglement, and can be used in subsequent operations, whereby a time-consuming labor-intensive process of preparing a quantum system is not required every time. The present application also provides a quantum data erasure system and device, and a readable storage medium, which have the above-mentioned beneficial effects that will not be described in detail herein.

BRIEF DESCRIPTION OF THE DRAWINGS

In order to describe the embodiments of the present application or the technical solutions in the prior art more clearly, drawings required to be used in the embodiments or the illustration of the prior art will be briefly introduced below. Apparently, the drawings in the illustration below are only some embodiments of the present application. Those ordinarily skilled in the art also can obtain other drawings according to the provided drawings without creative work.

DETAILED DESCRIPTION

The core of the present application is to provide a quantum data erasure method, system and device, and a readable storage medium, which are configured for erasing unknown quantum data.

In order that the objects, technical solutions and advantages of the embodiments of the present application will become more apparent, the technical solutions in the embodiments of the present application will now be described clearly and completely with reference to the accompanying drawings in the embodiments of the present application. It is obvious that the described embodiments are merely some, but not all, embodiments of the present application. Based on the embodiments of the present application, all other embodiments obtained by those skilled in the art without creative work shall fall within the protection scope of the present application.

Some classical formatting methods are to cover a memory area by writing "0" all at once. However, such methods cannot be realized legally in quantum computing for the following reasons:

In quantum theory, erasure of an arbitrary quantum state may be expressed as $Er|\psi\rangle \rightarrow |0\rangle$, where Er is an erasure operation, $|\psi\rangle$ is a known quantum state, and $|0\rangle$ is a standard quantum state.

If the erased state is a known quantum state, then only one unitary operation is required to prepare this state onto the standard state. However, a large number of qubits need to be erased in a quantum memory, and therefore quantum state erasure should be considered as erasing an unknown quantum state. Assuming that there are two unknown quantum states: $|\psi 1\rangle$ and $|\psi 2\rangle$, then:

$$Er|\psi 1\rangle \rightarrow |0\rangle$$

$$Er|\psi 2\rangle \rightarrow |0\rangle$$

If Er is required to be a unitary operation by quantum mechanics, then the above two formulas are simultaneous:

$$\langle \psi 1|\psi 2\rangle = \langle 0|0\rangle = 1$$

That is to say, $|\psi 1\rangle$ and $|\psi 2\rangle$ must be the same quantum state, which does not meet the requirements for operation of any two unknown quantum states. In other words, $Er|\psi\rangle \rightarrow |0\rangle$ cannot satisfy that Er is a unitary operation.

In fact, this clearing operation introduces environmental effects that destroy the quantum state of the system. This is not a desirable result for a quantum computing system. Therefore, the design of a safe and effective quantum device data erasure technology consistent with quantum mechanics logic has a great significance and potential wide application space, and a quantum data erasure method provided by the present application can solve the above-mentioned technical problem.

Figure 1:
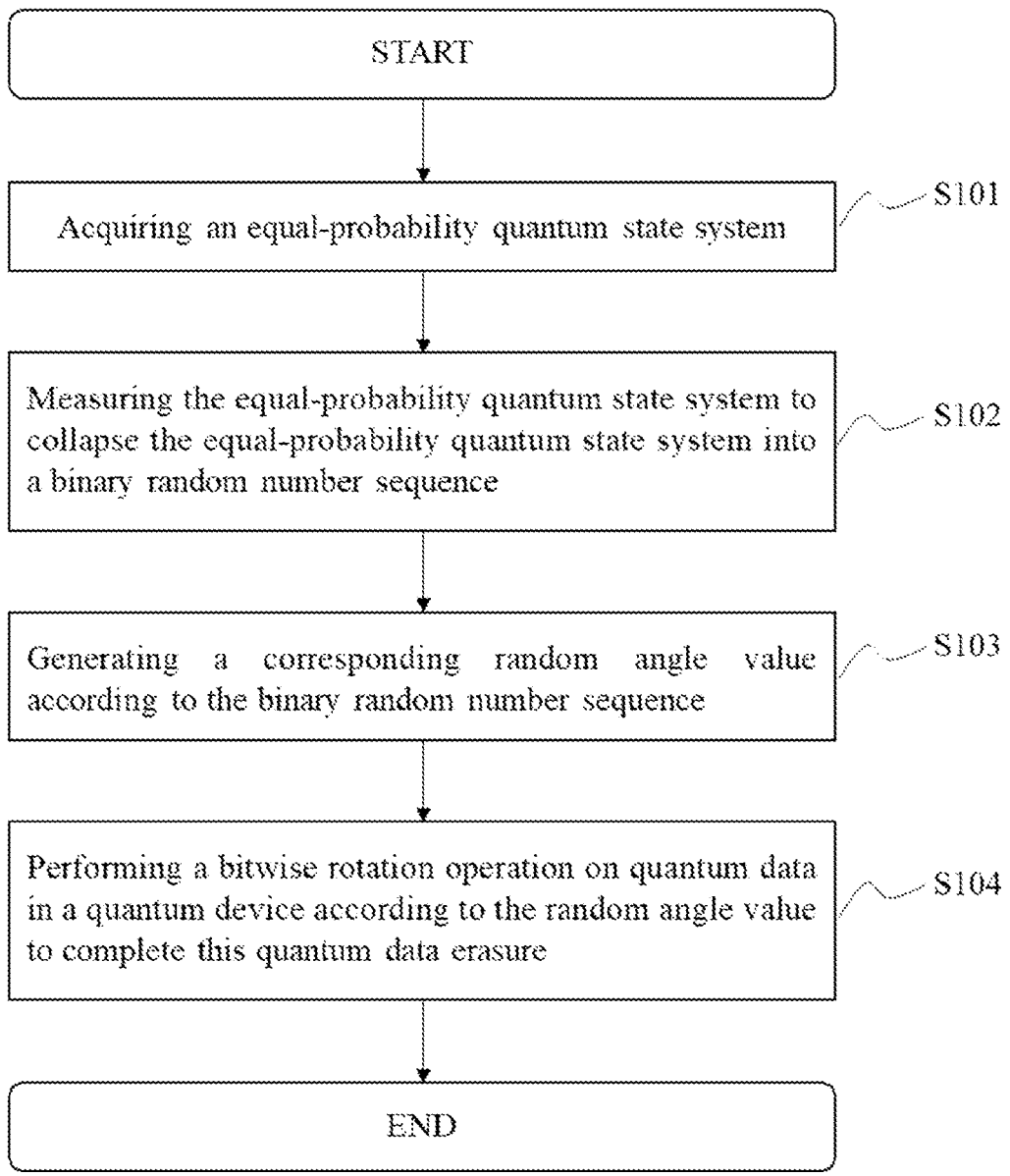
FIG. 1 is a flowchart of a quantum data erasure method according to an embodiment of the present application.

Referring to FIG. 1, FIG. 1 is a flowchart of a quantum data erasure method according to an embodiment of the present application.

The method specifically includes the following steps:

S101: Acquiring an equal-probability quantum state system.

An equal-probability principle means that when the system is in equilibrium, if there are no other restrictions except for certain energy, a certain volume and a certain number of particles, the probability of finding the system in each microscopic state is the same, which is called the equal-probability principle.

A quantum state is the central concept of quantum mechanics, which is a microscopic state determined by a set of quantum numbers. The position and velocity of quantum particles are regarded as external degrees of freedom, which is described by an external quantum state. The quantum state may be expressed as the superposition of different position states (with a determined position) and different velocity states (with a determined velocity). A wave function is a superposition coefficient. Mathematically, the quantum state is a vector (which may be understood as a set of numbers). The equal-probability quantum state system mentioned in this step refers to a quantum state system with all the measurement probabilities being equal.

Preferably, the equal-probability quantum state system may be acquired by preparing a series of standard quantum states and performing a Hadamard operation. That is, the acquiring an equal-probability quantum state system mentioned herein may be specifically:

generating the equal-probability quantum state system according to formula $$H^n|0\rangle = \frac{1}{2^{n/2}} \sum_{x \in \{0,1\}^n} |x\rangle,$$

where $H^n$ is a Hadamard matrix, $|0\rangle$ is a standard quantum state, $|x\rangle$ is an equal-probability quantum state, and n is the number of equal-probability quantum states in the equal-probability quantum state system.

The Hadamard matrix has important applications in information processing and processing analysis. In the embodiments of the present application, the acquisition of the equal-probability quantum state system is independent of the type of a quantum system, and is applicable to a light quantum system, a superconducting quantum system and a nuclear magnetic resonance quantum system.

S102: Measuring the equal-probability quantum state system to collapse the equal-probability quantum state system into a binary random number sequence.

Quantum collapse means that before observation, a quantum exists in the form of a wave (reflecting the probability of finding the quantum). During the observation, the quantum must exist at a certain position, i.e. the original quantum wave collapses to a point (which may also be called a needle wave). At this moment, the quantum exhibits particle property.

When the equal-probability quantum state system is measured, the equal-probability quantum state system collapses into a binary random number sequence, and the process is a true random process according to the quantum mechanics principle, i.e. the embodiments of the present application obtain a set of true random number sequences through measurement.

S103: Generating a corresponding random angle value according to the binary random number sequence.

In this step, the purpose of generating a corresponding random angle value according to the binary random number sequence is to perform a bitwise rotation operation on quantum data in a quantum device whereby a rotation angle of each quantum data is random. Then new quantum data obtained by performing the bitwise rotation operation is obtained according to a fixed rule, but cannot be predicted, so as to achieve the erasure of the quantum data.

Optionally, the generating a corresponding random angle value according to the binary random number sequence mentioned herein may be specifically:

converting the binary random number sequence into a decimal random number sequence; and generating the random angle value according to a preset accuracy and the decimal random number sequence.

For example, when the binary random number sequence is 0110, 0111, 1000, and 1001, the sequence is converted into a decimal random number sequence: 6, 7, 8, and 9. When the preset accuracy is two digits before the decimal point and two digits after the decimal point, the random angle value generated at this moment is 67.89°.

Optionally, when the preset accuracy needs to be changed, a user may input a corresponding modification command, and the system modifies the preset accuracy according to the input modification command at this moment.

Optionally, the generating a corresponding random angle value according to the binary random number sequence mentioned herein may also be specifically:

generating a corresponding floating point number according to the binary random number sequence on the basis of a preset rule; and determining the floating point number as the random angle value.

S104: Performing a bitwise rotation operation on quantum data in a quantum device according to the random angle value to complete this quantum data erasure.

In a specific embodiment, assuming that the quantum data in the quantum device is:

$$D0 = \begin{bmatrix} \alpha_1 & \cdots & \alpha_i & \cdots & \alpha_n \\ \beta_1 & \cdots & \beta_i & \cdots & \beta_n \end{bmatrix}$$

the bitwise rotation operation may be written as $$R(\theta_i) = \begin{bmatrix} \cos\theta_i & -\sin\theta_i \\ \sin\theta_i & \cos\theta_i \end{bmatrix}$$

Then a rotation operation is performed on each bit of quantum data with a corresponding $\theta_i$ to obtain erased quantum data:

$$D1 = R \cdot D0 = \begin{bmatrix} \alpha'_1 & \cdots & \alpha'_i & \cdots & \alpha'_n \\ \beta'_1 & \cdots & \beta'_i & \cdots & \beta'_n \end{bmatrix}$$

Since $R(\theta_i)$ is composed of random angles, D1 is obtained according to a fixed rule, but cannot be predicted, thus achieving the erasure of the quantum data.

D0 is the quantum data in the quantum device, $\alpha$ and $\beta$ are elements in a quantum data matrix respectively, R is a rotation operation matrix, D1 is quantum data after performing quantum data erasure, i is $i^{th}$ quantum data, and $\theta_i$ is a rotation angle of the $i^{th}$ quantum data.

Optionally, under the situation that data to be analyzed includes sensitive data, for example, when order data is analyzed, user personal information therein needs to be masked, and the remaining order information needs to be analyzed. At this moment, the sensitive information needs to be masked. After generating a corresponding random angle value according to the binary random number sequence, the embodiments of the present application can also achieve desensitization processing on the data by performing the following steps:

determining position information of non-sensitive data in the quantum data according to an input data desensitization instruction; and setting the random angle value corresponding to the position information to zero, and performing a bitwise rotation operation on the quantum data according to the random angle value to complete this quantum data desensitization.

Based on the above-mentioned embodiments, in the present application, when receiving an input data desensitization instruction, position information of non-sensitive data in quantum data is determined according to the data desensitization instruction, then the random angle value corresponding to the position information is set to zero, and a bitwise rotation operation is performed on the quantum data according to the random angle value. At this moment, sensitive data other than the non-sensitive data in the quantum data is rotated to complete this quantum data desensitization, thereby realizing the protection of the sensitive data.

Based on the above-mentioned technical solution, according to the quantum data erasure method provided by the present application, by measuring an acquired equal-probability quantum state system, the equal-probability quantum state system is collapsed into a binary random number sequence, a corresponding random angle value is then generated according to the binary random number sequence, and a bitwise rotation operation is performed on quantum data in a quantum device according to the random angle value to complete this quantum data erasure. The introduction of a quantum true random number in the whole process can ensure that erased data will not be recovered and reversely cracked, and is of great value in protecting data assets. Moreover, randomly processed data still has the characteristics such as quantum coherence and quantum entanglement, and can be used in subsequent operations, whereby a time-consuming labor-intensive process of preparing a quantum system is not required every time.

Figure 2:
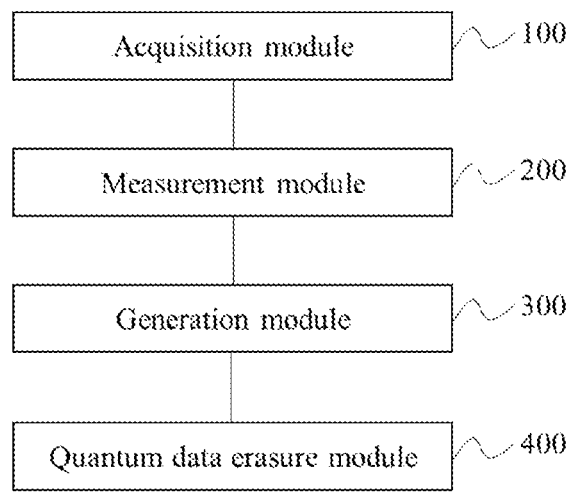
FIG. 2 is a structural diagram of a quantum data erasure system according to an embodiment of the present application.

Referring to FIG. 2, FIG. 2 is a structural diagram of a quantum data erasure system according to an embodiment of the present application.

The system may include:
an acquisition module 100, configured to acquire an equal-probability quantum state system;
a measurement module 200, configured to measure the equal-probability quantum state system to collapse the equal-probability quantum state system into a binary random number sequence;
a generation module 300, configured to generate a corresponding random angle value according to the binary random number sequence; and
a quantum data erasure module 400, configured to perform a bitwise rotation operation on quantum data in a quantum device according to the random angle value to complete this quantum data erasure.

On the basis of the above-mentioned embodiments, in a specific embodiment, the acquisition module 100 may include:
a second generation submodule, configured to generate the equal-probability quantum state system according to formula $$H^n|0\rangle = \frac{1}{2^{n/2}} \sum_{x \in \{0,1\}^n} |x\rangle,$$

where $H^n$ is a Hadamard matrix, $|0\rangle$ is a standard quantum state, $|x\rangle$ is an is an equal-probability quantum state, and n is the number of equal-probability quantum states in the equal-probability quantum state system.

On the basis of the above-mentioned embodiments, in a specific embodiment, the generation module 300 may include:
an acquisition submodule, configured to convert the binary random number sequence into a decimal random number sequence; and
a first generation submodule, configured to generate the random angle value according to a preset accuracy and the decimal random number sequence.

On the basis of the above-mentioned embodiments, in a specific embodiment, the generation module 300 may further include:
a modification submodule, configured to modify the preset accuracy according to an input modification command.

On the basis of the above-mentioned embodiments, in a specific embodiment, the system may further include:
a determination module, configured to determine position information of non-sensitive data in the quantum data according to an input data desensitization instruction; and
a data desensitization module, configured to set the random angle value corresponding to the position information to zero, and perform a bitwise rotation operation on the quantum data according to the random angle value to complete this quantum data desensitization.

Since the embodiments of the system part and the embodiments of the method part correspond to each other, the embodiments of the system part may be described with reference to the embodiments of the method part, and the descriptions will be omitted herein.

Figure 3:
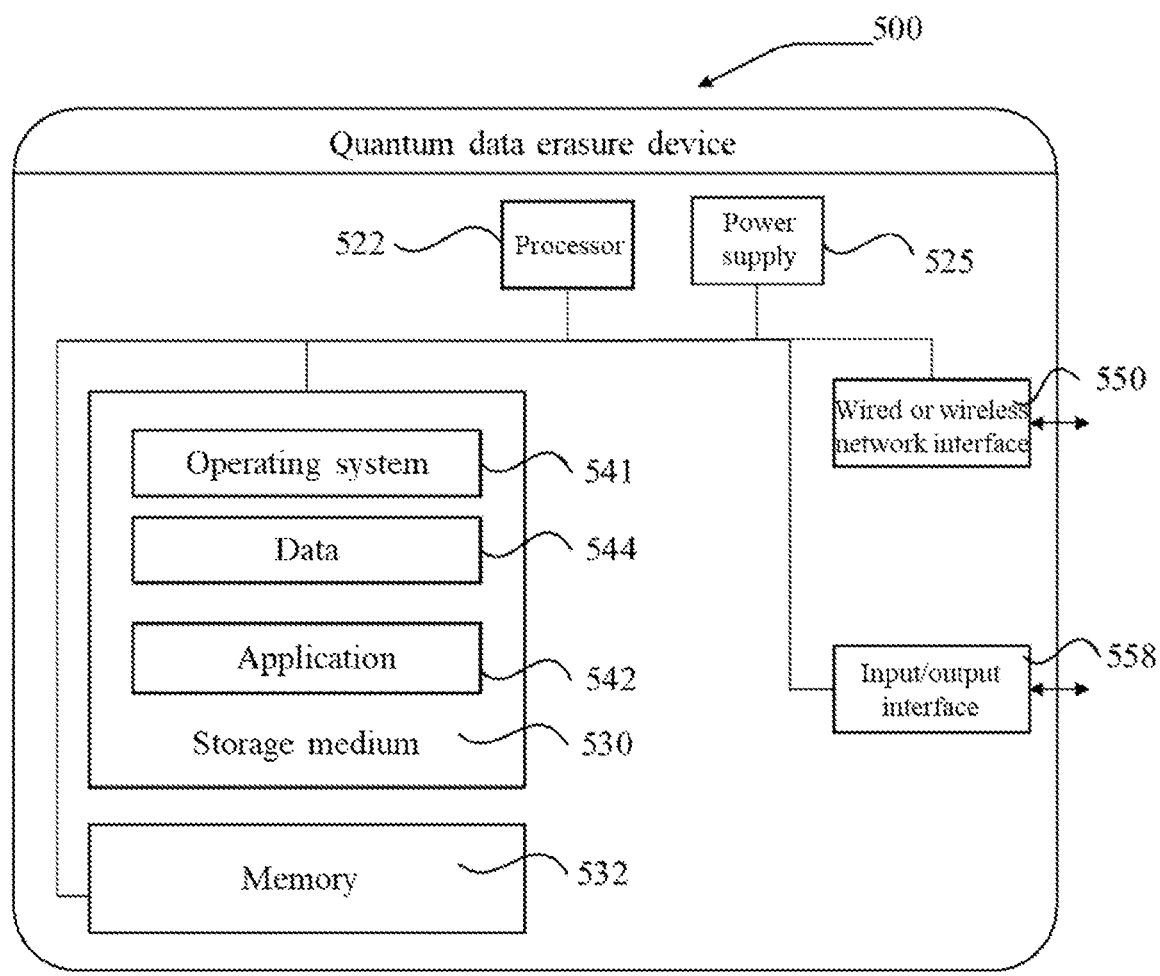
FIG. 3 is a structural diagram of a quantum data erasure device according to an embodiment of the present application.

Referring to FIG. 3, FIG. 3 is a structural diagram of a quantum data erasure device according to an embodiment of the present application.

The quantum data erasure device 500 may vary widely due to different configurations or performances, and may include one or more central processing units (CPUs) 522 (e.g. one or more processors), a memory 532, and one or more storage media 530 (e.g. one or more mass storage devices) for storing applications 542 or data 544. The memory 532 and the storage medium 530 may be a transient memory or a persistent memory. A program stored in the storage medium 530 may include one or more modules (not shown in the figure), and each module may include a series of instruction operations for the apparatus. Still further, the processor 522 may be configured to communicate with the storage medium 530 to execute a series of instruction operations in the storage medium 530 on the quantum data erasure device 500.

The quantum data erasure device 500 may also include one or more power supplies 525, one or more wired or wireless network interfaces 550, one or more input/output interfaces 558, and/or, one or more operating systems 541 such as Windows Server™, Mac OS X™, Unix™, Linux™, and FreeBSD™.

The steps in the quantum data erasure method described above in FIG. 1 are implemented by the quantum data erasure device based on the structure shown in FIG. 3.

It will be apparent to those skilled in the art that, for convenience and brevity of description, reference may be made to the corresponding processes in the foregoing method embodiments for the specific working procedures of the system, apparatus and modules described above, and the descriptions will be omitted herein.

In some embodiments provided by the present application, it will be appreciated that the disclosed apparatus, device and method may be implemented in another manner. For example, the apparatus embodiments described above are merely illustrative. For example, division of the modules is only logic function division, and other division manners may be adopted during practical implementation. For example, a plurality of modules or assemblies may be combined or integrated into another system, or some features may be omitted or not executed. In another aspect, the couplings or direct couplings or communication connections shown or discussed with respect to each other may be indirect couplings or communication connections through some interfaces, apparatuses, or modules, and may be electrical, mechanical, or otherwise.

The modules illustrated as separate components may or may not be physically separated, the components shown as modules may or may not be physical modules, i.e. may be located in one place, or may be distributed over a plurality of network modules. Some or all of the modules may be selected to achieve the objects of the solution in this embodiment according to actual needs.

In addition, each functional module in each embodiment of the present application may be integrated into one processing module, each module may physically exist separately, and two or more modules may be integrated into one module. The above-mentioned integrated modules may be realized in the form of hardware or in the form of software functional modules.

The integrated modules, if implemented in the form of software functional modules and sold or used as stand-alone products, may be stored in a computer-readable storage medium. Based on such an understanding, the technical solution of the present application, either substantively or in any part contributing to the prior art, or all or part of the technical solution, may be embodied in the form of a software product. The computer software product is stored in a storage medium, including a number of instructions for causing a computer device (which may be a personal computer, a function invoking apparatus, or a network device, etc.) to perform all or part of the steps of the method of various embodiments of the present application. The foregoing storage medium may include: various media capable of storing program codes, such as a U disk, a removable hard disk, a read-only memory (ROM), a random access memory (RAM), a magnetic disk, or an optical disk.

The quantum data erasure method, system and device, and the readable storage medium provided by the present application have been described in detail above. The principles and implementations of the present application have been set forth herein using specific examples. The above-described embodiments have been set forth only to aid in the understanding of the method and core ideas of the present application. It should be noted that a person of ordinary skill in the art may make numerous improvements and modifications to the present application without departing from the principles of the present application. Such improvements and modifications are intended to be within the scope of protection of the appended claims of the present application.

It should also be noted that relational terms such as first and second herein are used solely to distinguish one entity or operation from another entity or operation without necessarily requiring or implying any actual such relationship or order between such entities or operations. Moreover, the terms "include", "contain", or any other variations thereof are intended to cover a non-exclusive inclusion, whereby a process, method, article, or device including a series of elements not only includes those elements, but also includes other elements that are not explicitly listed, or also includes elements inherent to such process, method, article, or device. It is not excluded, without more constraints, that additional identical elements exist in the process, method, article, or device including elements defined by a sentence "including a . . . ".

What is claimed is:

1. A quantum data erasure method, comprising:
acquiring an equal-probability quantum state system;
measuring the equal-probability quantum state system to collapse the equal-probability quantum state system into a binary random number sequence;
generating a corresponding random angle value according to the binary random number sequence, wherein the generating a corresponding random angle value according to the binary random number sequence comprises:
converting the binary random number sequence into a decimal random number sequence; and
generating the random angle value according to a preset accuracy and the decimal random number sequence; and
performing a bitwise rotation operation on quantum data in a quantum device according to the random angle value to complete this quantum data erasure.

2. The method according to claim 1, wherein the acquiring an equal-probability quantum state system comprises:
generating the equal-probability quantum state system according to formula $$H^n|0\rangle = \frac{1}{2^{n/2}} \sum_{x \in \{0,1\}^n} |x\rangle,$$

where $H^n$ is a Hadamard matrix, $|0\rangle$ is a standard quantum state, $|x\rangle$ is an equal-probability quantum state, and n is the number of equal-probability quantum states in the equal-probability quantum state system.

3. The method according to claim 1, wherein the generating a corresponding random angle value according to the binary random number sequence comprises:
generating a corresponding floating point number according to the binary random number sequence on the basis of a preset rule; and
determining the floating point number as the random angle value.

4. The method according to claim 1, wherein after the generating a corresponding random angle value according to the binary random number sequence, the method further comprises:
determining position information of non-sensitive data in the quantum data according to an input data desensitization instruction; and
setting the random angle value corresponding to the position information to zero, and performing the bitwise rotation operation on the quantum data according to the random angle value to complete a quantum data desensitization.

5. A quantum data erasure apparatus, comprising:
a memory, configured to store a computer program; and
a processor, configured to implement, when executing the computer program, a quantum data erasure method comprising:
acquiring an equal-probability quantum state system;

measuring the equal-probability quantum state system to collapse the equal-probability quantum state system into a binary random number sequence;

generating a corresponding random angle value according to the binary random number sequence, wherein the generating a corresponding random angle value according to the binary random number sequence comprises:

converting the binary random number sequence into a decimal random number sequence; and generating the random angle value according to a preset accuracy and the decimal random number sequence; and performing a bitwise rotation operation on quantum data in a quantum device according to the random angle value to complete this quantum data erasure.

6. A non-transitory computer-readable storage medium, having a computer program stored thereon which, when executed by a processor, implements a quantum data erasure method comprising:

acquiring an equal-probability quantum state system;

measuring the equal-probability quantum state system to collapse the equal-probability quantum state system into a binary random number sequence;

generating a corresponding random angle value according to the binary random number sequence, wherein the generating a corresponding random angle value according to the binary random number sequence comprises:

converting the binary random number sequence into a decimal random number sequence; and generating the random angle value according to a preset accuracy and the decimal random number sequence; and performing a bitwise rotation operation on quantum data in a quantum device according to the random angle value to complete this quantum data erasure.

7. The method according to claim 1, wherein the acquiring the equal-probability quantum state system is independent of a type of a quantum system, and is applicable to a light quantum system, a superconducting quantum system and a nuclear magnetic resonance quantum system.

8. The method according to claim 1, wherein the binary random number sequence is a set of true random number sequences.

9. The method according to claim 1, further comprising modifying the preset accuracy according to a modification command.

10. The method according to claim 1, further comprising assuming the quantum data in the quantum device to be $$D0 = \begin{bmatrix} \alpha_1 & \dots & \alpha_i & \dots & \alpha_n \\ \beta_1 & \dots & \beta_i & \dots & \beta_n \end{bmatrix},$$

a bitwise rotation operation is $$R(\theta_i) = \begin{bmatrix} \cos\theta_i & -\sin\theta_i \\ \sin\theta_i & \cos\theta_i \end{bmatrix},$$

a rotation operation is performed on each bit of the quantum data with a corresponding $\theta_i$ to obtain erased quantum data $$D1 = R \cdot D0 = \begin{bmatrix} \alpha'_1 & \dots & \alpha'_i & \dots & \alpha'_n \\ \beta'_1 & \dots & \beta'_i & \dots & \beta'_n \end{bmatrix},$$

wherein D0 is the quantum data in the quantum device, $\alpha$ and $\beta$ are elements in a quantum data matrix respectively, R is a rotation operation matrix, D1 is quantum data after performing quantum data erasure, i is ith quantum data, and $\theta_i$ is a rotation angle of the ith quantum data.

11. The quantum data erasure apparatus according to claim 5, wherein the acquiring an equal-probability quantum state system comprises:

generating the equal-probability quantum state system according to formula $$H^n|0\rangle = \frac{1}{2^{n/2}} \sum_{x \in \{0,1\}^n} |x\rangle,$$

where $H^n$ is a Hadamard matrix, $|0\rangle$ is a standard quantum state, $|x\rangle$ is an equal-probability quantum state, and n is the number of equal-probability quantum states in the equal-probability quantum state system.

12. The quantum data erasure apparatus according to claim 5, wherein the generating a corresponding random angle value according to the binary random number sequence comprises:

generating a corresponding floating point number according to the binary random number sequence on the basis of a preset rule; and determining the floating point number as the random angle value.

13. The quantum data erasure apparatus according to claim 5, wherein after the generating a corresponding random angle value according to the binary random number sequence, the method further comprises:

determining position information of non-sensitive data in the quantum data according to an input data desensitization instruction; and setting the random angle value corresponding to the position information to zero, and performing the bitwise rotation operation on the quantum data according to the random angle value to complete a quantum data desensitization.

14. The quantum data erasure apparatus according to claim 5, the acquiring the equal-probability quantum state system is independent of a type of a quantum system, and is applicable to a light quantum system, a superconducting quantum system and a nuclear magnetic resonance quantum system.

15. The quantum data erasure apparatus according to claim 5, wherein the binary random number sequence is a set of true random number sequences.

16. The quantum data erasure apparatus according to claim 5, further comprising modifying the preset accuracy according to a modification command.

17. The quantum data erasure apparatus according to claim 5, wherein the quantum data in the quantum device is assumed to be $$D0 = \begin{bmatrix} \alpha_1 & \dots & \alpha_i & \dots & \alpha_n \\ \beta_1 & \dots & \beta_i & \dots & \beta_n \end{bmatrix},$$

a bitwise rotation operation is $$R(\theta_i) = \begin{bmatrix} \cos\theta_i & -\sin\theta_i \\ \sin\theta_i & \cos\theta_i \end{bmatrix},$$

a rotation operation is performed on each bit of the quantum data with a corresponding θi to obtain erased quantum data $$D1 = R \cdot D0 = \begin{bmatrix} \alpha'_1 & \cdots & \alpha'_i & \cdots & \alpha'_n \\ \beta'_1 & \cdots & \beta'_i & \cdots & \beta'_n \end{bmatrix},$$

wherein D0 is the quantum data in the quantum device, α and β are elements in a quantum data matrix respectively, R is a rotation operation matrix, D1 is quantum data after performing quantum data erasure, i is ith quantum data, and θi is a rotation angle of the ith quantum data.

18. The non-transitory computer-readable storage medium according to claim 6, wherein the acquiring an equal-probability quantum state system comprises:
generating the equal-probability quantum state system according to formula $$H^n|0\rangle = \frac{1}{2^{n/2}} \sum_{x \in \{0,1\}^n} |x\rangle,$$

where $H^n$ is a Hadamard matrix, $|0\rangle$ is a standard quantum state, $|x\rangle$ is an equal-probability quantum state, and n is the number of equal-probability quantum states in the equal-probability quantum state system.

* * * * *